US005438085A

United States Patent [19]

Burkett

[11] Patent Number: 5,438,085

[45] Date of Patent: Aug. 1, 1995

[54] SIMULATED LEATHER-LIKE COATING FOR A VEHICLE SUBSTRATE

[76] Inventor: John Burkett, 4705 Meadowbrook, Clarkston, Mich. 48016

[21] Appl. No.: 76,007

[22] Filed: Jun. 11, 1993

Related U.S. Application Data

[63] Continuation-in-part of Ser. No. 898,918, Jun. 12, 1992, abandoned.

[51] Int. Cl.[6] .......... C08L 1/00; C08K 5/06; C08K 3/34

[52] U.S. Cl. .......... 524/31; 524/35; 524/375; 524/493

[58] Field of Search .......... 524/35, 379, 493, 31, 524/32, 385, 390

[56] References Cited

U.S. PATENT DOCUMENTS

| | | | |
|---|---|---|---|
| 3,904,791 | 9/1975 | Iverson | 427/277 |
| 3,994,843 | 11/1976 | Hickey | 260/174 CL |
| 4,155,769 | 5/1979 | Almagro | 106/193 J |
| 4,263,051 | 4/1981 | Crawford et al. | 106/308 |
| 4,734,295 | 3/1988 | Liu | 427/64 |
| 4,795,777 | 1/1989 | Higginbotham et al. | 524/441 |
| 4,806,583 | 2/1989 | Battaglia | 524/315 |
| 4,824,728 | 4/1989 | Parsons et al. | 428/421 |
| 4,842,613 | 6/1989 | Purser | 8/471 |
| 4,910,070 | 3/1990 | Al'Hariri | 428/181 |
| 5,021,290 | 6/1991 | Rowell | 428/319.3 |

*Primary Examiner*—Paul R. Michl
*Assistant Examiner*—LaVonda R. DeWitt
*Attorney, Agent, or Firm*—Harness, Dickey & Pierce

[57] ABSTRACT

A method is provided for producing a sprayed-on leather-like coating. The steps include first applying an acrylic primer layer. Second, a mixture of an acrylic lacquer, a drying retarder and a flattening agent is sprayed onto the acrylic primer layer to produce a leather-like appearance.

7 Claims, 1 Drawing Sheet

SIMULATED LEATHER-LIKE COATING FOR A VEHICLE SUBSTRATE

This application is a continuation-in-part of U.S. patent application Ser. No. 07/898,918, filed Jun. 12, 1992, now abandoned.

BACKGROUND OF THE INVENTION

The present invention relates to a spray-on leather-like finish coating for vehicle interior surfaces. More particularly, the present invention relates to a two-step simplified process for using readily available acrylic lacquers in a spray painting composition to provide a leather-like look to a vehicle interior surface.

In recent years, in prototyping and finishing of vehicle surfaces it has been desirable to present suitable alternative coatings to simulate leather looks in dash boards and the like. Such a coating is desirable in that it would be easy to apply and more inexpensive than similar vinyl coated substrates or actual leather. Coatings are desirable in that they can be readily applied to prototypes or final production vehicles as may be desired in particular applications. Additionally, such coatings can find ready use in refinishing dashboard surfaces or other interior surfaces of used vehicles which are being restored. There have been various attempts to create leather-like or other textured surfaces, however, many of these require specific complex ingredients and also require special processing steps such as utilizing various mold forms or mechanical shaping or the like which have textured patterns for imprinting the final texture on a coating. Similarly, while providing a roughed-up type look the coatings do not readily lend themselves to a leather-like look since the coatings formed by these articles have ridges, crinkles and the like between domains rather than leather-like cracks throughout the surface. Thus, these coatings have failed in presenting simplified leather-look coatings.

Examples of some attempts to provide leather-like or other textured surfaces include U.S. Pat. No. 3,904,791 to Iverson et al. and U.S. Pat. No. 3,994,843 to Hickey. The '791 patent to Iverson et al. discloses a method for producing decorative and ornamental articles in simulation of wood grain, leather and the like. This method, however, requires that the coating layer be mechanically furrowed to develop a textured pattern therein in simulation of wood or leather graining, or otherwise disrupted to develop a distinctive pattern. This reference discloses a lacquer as one of several possible coating vehicles used and a flattener admixed in the vehicle to provide a surface variation, however, some type of mechanical manipulation is necessary. The '843 patent to Hickey discloses an aqueous-based coating material to which fillers can be added to alter the texture thereof. In addition, fillers such as decorative flakes or chips are used in the Hickey patent to alter the texture of the coating.

Other patents which disclose coatings for dashboards include U.S. Pat. Nos. 4,734,295 to Liu; 4,806,583 to Battaglia; 4,842,613 to Purser; 4,910,070 to Al'Hariri; and 4,155,769 to Almagro. These patents disclose various coatings for dashboards and the like, but are primarily concerned with reduction of glare and as such, flat type paints are provided.

Prior to the present invention Applicant also is aware that a "Stano-Lac" flattening agent has been known by others to cause some paint finishes to crack. However, such cracking was highly unpredictable and created large cracks between large areas of paint. It is believed that because of these problems, such a finish has found use only in a fishing lure application wherein it is called a "crackle frog" finish because of its frog-like appearance.

Thus, it remains a goal in the vehicle finishing art to produce a leather-like coating which accurately simulates a leather appearance, is easy to apply and does not require external tools or the like for producing desirable results.

SUMMARY OF THE INVENTION

Thus, in accordance with the present invention there is provided a method for coating an article with a simulated leather look coating comprising the steps of first coating a substrate with a first lacquer primer layer and thereafter coating the first lacquer layer after curing thereof with a second layer comprising an effective amount of a mixture of a lacquer and flattening agent whereby the flattening agent causes the second layer to form a leather-like wet surface which cures in a leather-like pattern. Thus, in the present invention there is provided a simple two-step coating process which provides a nearly identical copy of a leathered-look on any vehicle substrate desired. The present invention has the advantage that the coating texture may be varied to provide various leather textures by simply recoating the substrate with further coatings of the lacquer flattening agent mixture prior to curing of the second layer.

Further benefits and advantages of the present invention will be understood by those skilled in the art in view of the description of the preferred embodiment set forth below taken in conjunction with the claims appended hereto and the drawings which are described below. All percentages set forth herein are percentages by volume unless otherwise specified.

DESCRIPTION OF THE PREFERRED EMBODIMENTS

Figure 1:
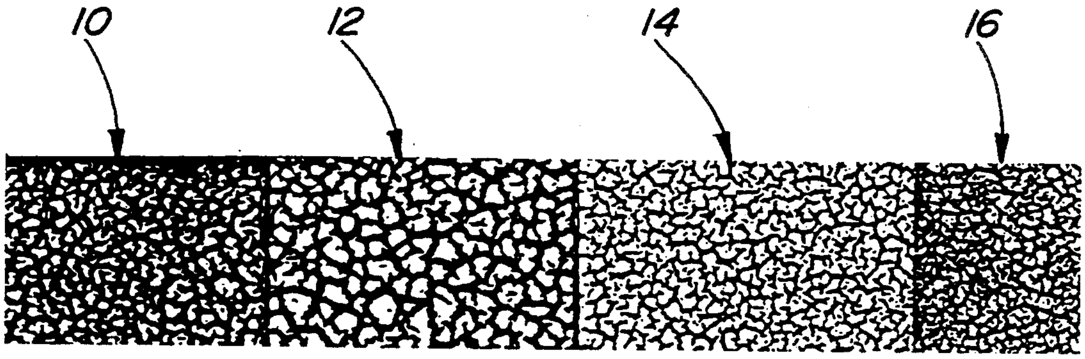
FIG. 1 is an illustration of the various textured coatings which can be accomplished in accordance with the teachings of the present invention.

In accordance with the broad aspects of the present invention there is provided a method for coating an article with a simulated leather look coating. The method includes the steps of first coating a substrate with a first lacquer layer as a primer. The second and critical step of the present invention is coating the first lacquer layer with a second layer which is a mixture of a lacquer and an effective flattening agent, for forming a leather-like appearance, in effective amounts whereby the second layer forms a leather-like coating on the coated substrate.

Thus, in a preferred embodiment the substrate must first be prepared for painting as is readily known to those skilled in the art. Thereafter, one or two coats of a suitable primer is applied to the substrate and allowed to dry or cure. Typically, suitable primers include acrylic lacquers which are typical automotive primers commonly in use in the industry today. Examples of suitable acrylic lacquer primers include Sherwin Williams Super Combo Red Primer; R&M Products Universal Primer Surfacer Lacquer APS-423 OEM Gray; DuPont Products Red Oxide Lacquer Primer 80-S;

PPG Products DZL 272 Red Acrylic Lacquer Primer; and others as are known to those skilled in the art.

The second step is a critical step in producing the coatings of the present invention. To achieve the desired leather-like effect it is necessary to have the substrate or article coated with the primer as set forth above. The material used for coating in the second step of the present invention is preferably an acrylic lacquer compatible with the primer coating which includes a drying retarder and a flattening agent. Preferably, the acrylic lacquer includes as a part thereof a quantity of a drying retarder agent or the like as are commercially available. While a drying retarder agent is preferred, similar results can be achieved by use of standard paint thinners compatible with acrylic paint systems. Generally, concentrations of lacquer and flattening agent suitable for use in the present invention include from about 35% to about 85% of the lacquer constituent and from about 25% to about 75% of the flattening agent. Typically, from about 50% to about 60% lacquer is utilized with from about 40% to about 50% flattening agent. In a preferred embodiment from about 60% to about 65% lacquer is utilized with from about 40% to about 45% flattening agent.

As stated above, in a preferred embodiment, the lacquer material utilized includes a first lacquer paint portion and a second drying retarder portion. Generally, such are utilized in quantities of from about 15% to about 40% lacquer with from about 60% to about 85% retarder. Typically from about 20% to about 30% of lacquer is utilized with from about 70% to about 80% retarder. Thus, it can be ascertained that compositions of the present invention include from about 5% to about 75% of a lacquer paint constituent; from about 20% to about 75% of a drying retarder; and from about 15% to about 75% of a flattening agent.

In a preferred embodiment three parts retarder, one part lacquer paint and three parts flattening agent are utilized (parts by volume). The lacquer portion may be selected from any of the readily known acrylic lacquers, for instance, Sher-Lac-Global Acrylic Lacquer System 301 White; Alpha-Cryl Acrylic Lacquer A-2080 White; DuPont Lucite Acrylic Lacquer; Duracryl Acrylic Lacquers and others are suitable in the present invention. Suitable drying retarders include those known in the art, such as thinners and other commercially available retarding agents which will slow down the drying or cure of the lacquer. These agents, in the ranges provided, are preferred in the present invention to provide the proper effect to allow the lacquer flattening agent mixture to create the leather-like grain effect prior to curing of the coating. This combination of lacquer and a retarder or thinner comprises the lacquer constituent portion of this mixture.

Flattening agents useful in the present invention are not those readily known and compatible with acrylic lacquer systems. Thus, a preferred constituent is a lacquer flattening agent believed to be useful in house paint type lacquers produced by Standard Paint Company, Detroit, Mich., under the designation L-9008.

With respect to the flattening agent, in a preferred embodiment the flattening agent includes silicon dioxide as a primary constituent in ranges of from about 1% to about 40%, with preferred ranges being from about 5% to about 25% silicon dioxide. Thus, providing from about 1% to about 30% concentration of silicon dioxide in the final lacquer and flattening agent mixture. A particularly preferred silicon dioxide constituent is a Syloid LV-6 obtainable from Grace Chemicals. Suitable flattening agents also are utilized with volatile or fugitive organic solvents and preferably include from about 3% to about 10% of a nitrocellulosic polymer and from about 15% to about 30% of an alcohol constituent preferably n-butyl alcohol. Thus, in the final compositions the concentration of nitrocellulose is from about 1% to about 6% and the n-butyl alcohol content is from about 5% to about 17%. A particularly preferred flattening agent includes about 7% to about 12% silicon dioxide, 5.5% nitrocellulose and succinate/glycol polymer with the remainder being volatile solvents. The solvent mixture of a preferred flattening agent includes acetone (1%), n-butyl alcohol (23%), n-butyl acetate (21%), isobutyl acetate (22%), ethyl benzene ( 1%), methyl ethyl ketone ( 1%), methyl isobutyl ketone (18%), toluene (6%) and xylene (7%). As stated above, a particularly preferred flattening agent is a Standard Paint Company, Detroit, Mich., "Stano-Lac" Lacquer Flatting Agent having the designation L-9008. While succinate/glycol polymers are set forth above, it is now believed that such plasticizers actually hinder the operation of the present coating. Therefore, it would be more preferable to leave the plasticizer constituent of the coating out of the present invention if possible, although minor amounts are not harmful. While such .agent is preferably used with its volatile constituents intact it may be possible to substitute suitable silica/nitrocellulose/alcohol compositions in percentages of from about 20% to about 40% with from about 60% to about 80% lacquer/thinner constituents. This particular compositional mixture preferably includes a nitrocellulose polymer with solvents including n-butyl alcohol. A preferred solid agent useful in the present invention is a Syloid LV-6 silica material, obtainable from Grace Chemicals, mixed with a nitrocellulose material obtainable from Hercules, Inc. and an alcohol constituent such as n-butyl alcohol, available commercially. Without wishing to be bound by theory it is believed that the combination of the silicon dioxide, nitrocellulose and an alcohol, when used in an acrylic lacquer retarder mixture in the quantities set forth above, causes the advantageous leather-like appearance in the final coating. However, of course if the individual components are utilized rather than the above listed L-9008 product, the solvent mix which was contained in that product should be replaced for best results. Coatings of the present invention are designed to be readily sprayable with standard spray painting equipment. Thus, no special molds or the like are necessary for the coatings of the present invention. Coatings of the present invention are suitable for gravity feed type sprayers commonly found in paint shops. The coatings of the present invention are thus painted coatings which have thicknesses of from about 3 to about 10 thousandths of an inch and have leather-like crevices in the coating.

In a preferred embodiment, the primer is allowed to cure prior to coating the substrate with the second critical coating. The leather-like effect automatically occurs when the above constituents are utilized and may be varied in texture by spraying a second coating of the mixture of the second critical layer prior to drying or cure of the second layer. Thus, if a fine type leather grain is desired a single coating is adequate; however, if a wider type grain is desirable several coatings prior to curing of the final coating will create the desired effect. Some types and variations in coatings are shown in FIG. 1. The coatings shown in FIG. 1 include lighter areas formed by the second coating which exposes the primer layer shown in the darker areas. Thus, the second coating tends to separate in congealed raised areas leaving a leather-like grain running therebetween, shown in the dark areas of the figures.

As a final step the coating may be allowed to cure and a finish coating such as a pigmented final acrylic lacquer coat or a clear coat may be applied to seal the textured surface and present a final leather-like surface suitable for vehicle interior use. Any of a variety of finish coatings may be applied over the cured acrylic lacquers after the leather-like coating is fully dry. It has been found that urethanes, enamels or other paints may be applied as finish coatings for the present invention.

Coatings of the present invention may be applied to various vehicle parts such as dashboards, seatbelt retractor housings, arm rests or the like. Coatings of the present invention are particularly suitable for providing finished surface coatings to prototype parts and the like. However, the coating also can be utilized as a surface from which a mold could be created to produce a number of molded parts having a leather-like finish.

Further understanding of the present invention will be had by reference to the examples set forth below for purposes of illustration but not limitation herein.

EXAMPLE I

A suitable substrate is prepared in accordance with standard surface preparation procedures in the paint industry. As an example the sheet metal surface is sanded and washed with a suitable solvent and the like until a dust-free surface suitable for painting is achieved. The surface is first sprayed with two coats of a DZL Red Acrylic Lacquer Primer. A gravity fed Craco Model 600 type spray gun is utilized with a fine spray with a pressure of 20–40 psi.

A mixture of the present invention is prepared wherein three parts PPG Duracryl Acrylic Lacquer Retarder, one part light blue PPG Duracryl Acrylic Lacquer and three parts Standard Paint Co. L-9008 Lacquer flattening paste are utilized.

After the primer coating is allowed to cure the above mixture of lacquer, retarder and flattening paste is sprayed on the primed surface. A leather-like coating is produced upon cure thereof. The final appearance of this coating is shown in FIG. 1 at segment 10.

EXAMPLE II

Example I is repeated with the exception that several coats of the second lacquer, flattening paste and retarder coating are utilized prior to cure of the coating. A larger grain leather look coating is created and allowed to cure.

EXAMPLE III

Utilizing the procedure set forth in Example I, leather-like coatings are prepared utilizing the following constituents listed in Table I.

TABLE I

| COATING | A | B | C |
|---|---|---|---|
| Primer | Super Combo** Red Primer (2 coats) | Universal Prime APS 423 OEM Gray*** | Red Oxide Lacquer Primer 80–85**** |
| Retarder | Universal Retarder R7K 6251** | R-M Alpha-Cryl Thinner PNT-90*** | 36025 Acrylic Lacquer Thinner**** |
| Lacquer | Sher-Lac Global Acrylic System 301 White** | R-M Alpha-Cryl A-2080 White Paint* | Lucite Acrylic Lacquer 817L White**** |
| Flattening Agent | Stano Lac Lacquer L-9008 Flattening Agent* | Stano Lac Lacquer L-9008 Flattening Agent | Stano Lac Lacquer L-9008 Flattening Agent* |

*Standard Paint Co., Detroit, MI
**Sherwin Williams, Co., Cleveland, OH
***R & M Products (BASF), Dearborn, MI
**DuPont Each of the above utilized in a three-part flattening agent, three-part retarder and one-part lacquer produced leather-like coating over the primers shown. Coating A produced the results shown in FIG. 1 at segment 16. Coating B is shown in FIG. 1 at segment 14. Coating C is shown in FIG. 1 at segment 12**.

EXAMPLE IV

The process of Example 1 is repeated utilizing from the following:

a) 11% lacquer; 34% retarder; and 55% flattening agent;
b) 18% lacquer, 43% retarder; and 35% flattening agent;
c) 12% lacquer; 38% retarder; and 50% flattening agent;
d) 15% lacquer; 45% retarder; and 40% flattening agent;
e) 5% lacquer; 20% retarder; and 75% flattening agent;
f) 35% lacquer; 20% retarder; and 45% flattening agent; and
g) 30% lacquer; 55% retarder; and 15% flattening agent.

Each of the above compositions is found to produce a leather-like surface appearance on the substrate.

EXAMPLE V

Example I is repeated, however, in this case a solid agent Syloid LV-6 is utilized and substituted for the flattening agent. A leather-like finish is created, however, the uniformity of the surface is not entirely consistent.

EXAMPLE VI

The coatings of Examples I, II and III are sprayed with a finish lacquer coating. The resulting coating is found to achieve a very realistic leather-like appearance.

EXAMPLE VII

A flattening agent is formulated utilizing 7.5% nitrocellulose resin, 12.5% Syloid LV-6, 40% butyl acetate, 20% butyl alcohol, and 20% methyl isobutyl ketone (all parts by weight). The Syloid content is varied in the above formula such that levels of 1%, 5%, 9%, 12% and 25% are obtained with the remainder of the constituents utilized in the same proportions to one another.

A retarder which includes 60% PM acetate, 15% toluene, 11% xylene, 11% DBE, 29% isopropyl alcohol and 1% acetone is utilized. The compositions are formulated utilizing the proportions set forth in Example IV in accordance with the process of Example I.

Each of the samples is found to produce a leather-like surface appearance on the substrate.

While the invention has been described with reference to the preferred embodiments above, it is to be understood and appreciated that the invention is susceptible to modification, variation and change without departing from the proper scope and fair meaning of the accompanying claims.

What is claimed is:

1. A lacquer composition for producing a leather-like appearance coating on an acrylic lacquer substrate, said composition comprising:

from about 35% to about 85% of a lacquer constituent, wherein said lacquer constituent comprises an acrylic lacquer paint and a drying retarder; and from about 25% to about 75% of a flattening agent, wherein said flattening agent comprises from about 1% to about 40% of a silicon dioxide, from about 3% to about 10% of a nitrocellulose constituent from about 15% to about 30% of an alcohol constituent, with any remainder comprising volatile solvents the total amount of said lacquer constituent and said flattening agent not exceeding 100%, whereby a leather grained coating is formed on said substrate upon application of said coating.

2. The lacquer composition of claim 1 wherein said lacquer constituent comprises from about 15% to about 40% of said lacquer paint and from about 60% to about 85% of said drying retarder.

3. The composition of claim 1 wherein said volatile solvents are selected from the group consisting of acetone, n-butyl acetate, isobutyl acetate, ethyl benzene, methyl ethyl ketone, methyl isobutyl ketone, toluene and xylene.

4. The composition of claim 1 wherein said lacquer constituent from about 50% to about 60% of said lacquer constituent and is from about 40% to about 50% of said flattening agent. The composition of claim 12 wherein the lacquer constituent is from about 50 to about 60% of the composition and the flattening agent is from about 40 to about 50% of the composition.

5. The composition of claim 4 wherein said lacquer constituent comprises from about 20% to about 30% of said lacquer paint and from about 70% to about 80% of said retarder.

6. The composition of claim 5 wherein said retarder is selected from the group consisting of paint thinners and commercial drying retarders.

7. A lacquer composition for producing a leather-like coating on an acrylic lacquer substrate, said composition comprising:

from about 5% to about 35% of a lacquer paint constituent;

from about 20% to about 75% of a drying retarder;

from about 15% to about 75% of a flattening agent comprising from about 15% to about 25% of a silicon dioxide containing constituent; from about 3% to about 10% of a nitrocellulosic polymer; from about 15% to about 30% n-butyl alcohol; and the remainder being a solvent mixture, the total amount of said paint constituent said drying retarder and said flattening agent not exceeding 100%, whereby a leather grained coating is formed on said substrate by application of said composition to said substrate.

* * * * *

UNITED STATES PATENT AND TRADEMARK OFFICE

CERTIFICATE OF CORRECTION

PATENT NO. : 5,438,085

DATED : August 1, 1995

INVENTOR(S) : John Burkett

It is certified that error appears in the above-indentified patent and that said Letters Patent is hereby corrected as shown below:

Title page, Prior Art, "Iverson" should be --Iverson, et al--

Column 3, Line 1, "DZL 272" should be --DZL 72--

Column 3, Line 66, "1%" should be --.1%--

Column 8, Claim 4, delete "The composition of claim 1 wherein said lacquer constituent from about 50% to about 60% of said lacquer constituent and is from about 40% to about 50% of said flattening agent."

Signed and Sealed this

Ninth Day of April, 1996

Attest:

BRUCE LEHMAN

*Attesting Officer* *Commissioner of Patents and Trademarks*